United States Patent
Yoo et al.

(10) Patent No.: US 8,783,747 B2
(45) Date of Patent: Jul. 22, 2014

(54) LAMINATE STRUCTURE GENERATOR, AND STACKING METHOD AND APPARATUS FOR SECONDARY CELL INCLUDING THE SAME

(75) Inventors: Jai Suk Yoo, Gyeonggi-do (KR); Moon Gu Lee, Gyeonggi-do (KR); Jeong Jae Lee, Busan (KR)

(73) Assignee: Ajou University Industry-Academic Cooperation Foundation (KR)

( * ) Notice: Subject to any disclaimer, the term of this patent is extended or adjusted under 35 U.S.C. 154(b) by 276 days.

(21) Appl. No.: 13/178,894

(22) Filed: Jul. 8, 2011

(65) Prior Publication Data

US 2013/0011235 A1 Jan. 10, 2013

(51) Int. Cl.
*H01M 10/00* (2006.01)
*B66C 1/42* (2006.01)
*B65G 57/00* (2006.01)

(52) U.S. Cl.
USPC ............. 294/119.1; 294/67.33; 414/789.5

(58) Field of Classification Search
USPC ........... 294/67.33, 87.26, 87.1, 99.2, 119.1, 294/156, 165, 86.4; 414/789.5, 590, 665, 414/669; 53/157, 540
See application file for complete search history.

(56) References Cited

U.S. PATENT DOCUMENTS

| | | | | |
|---|---|---|---|---|
| 4,423,998 A * | 1/1984 | Inaba et al. | ................. | 294/119.1 |
| 4,579,380 A * | 4/1986 | Zaremsky et al. | ......... | 294/119.1 |
| 4,801,168 A * | 1/1989 | Sato | .............................. | 294/87.1 |
| 4,900,078 A * | 2/1990 | Bloch | ........................... | 294/86.4 |
| 4,968,077 A * | 11/1990 | Redmon et al. | .................. | 294/16 |
| 5,082,413 A * | 1/1992 | Grosz et al. | ..................... | 414/24.5 |
| 5,100,285 A * | 3/1992 | Wagner | ....................... | 414/744.8 |
| 6,082,797 A * | 7/2000 | Antonette | ................... | 294/103.1 |
| 6,305,728 B1 * | 10/2001 | Holter et al. | ............... | 294/67.32 |
| 7,322,623 B2 * | 1/2008 | Morton | ....................... | 294/119.1 |
| 7,887,108 B1 * | 2/2011 | Cawley et al. | ................ | 294/106 |

FOREIGN PATENT DOCUMENTS

JP 2009-199835 9/2009

OTHER PUBLICATIONS

Official Action for Japanese Patent Application No. 2011-154368, dated Apr. 13, 2013, 2 pages.

* cited by examiner

*Primary Examiner* — Paul T Chin
(74) *Attorney, Agent, or Firm* — Sheridan Ross P.C.

(57) ABSTRACT

A stacking apparatus for a secondary cell includes a guide roller guiding a film, and a laminate structure generator disposed parallel to the film vertically descended by the guide roller, the laminate structure generator includes a first hand including a first palm and a first finger extending from the first palm, the first finger being disposed parallel to the film to face one side of the film, and a second hand including a second palm and a second finger extending from the second palm to cross the first finger, the second finger being disposed parallel to the film to face the other side of the film, at least one of the first hand and the second hand being moved in a direction of separating from the other.

14 Claims, 14 Drawing Sheets

LAMINATE STRUCTURE GENERATOR, AND STACKING METHOD AND APPARATUS FOR SECONDARY CELL INCLUDING THE SAME

BACKGROUND

1. Technical Field

The present disclosure generally relates to a laminate structure generator, and a stacking method and apparatus for a secondary cell including the same and, more particularly, to a laminate structure generator capable of reducing manufacturing time of a secondary cell, and a stacking method and apparatus for a secondary cell including the same.

2. Description of the Related Art

Generally, a chemical cell is composed of two electrodes, that is, a cathode and an anode, and an electrolyte, and may generate electrical energy based on materials constituting the electrodes and the electrolyte. Chemical cells are classified into a primary cell which is a disposable cell used only for charging once due to very low charging reaction, and a secondary cell which is a rechargeable cell repeatedly used through recharging reaction.

Secondary cells are used in a wide range of industrial applications. For example, secondary cells are used as an energy source for advanced electronics such as wireless mobile devices. Further, secondary cells have attracted attention as an energy source for hybrid electrical vehicles that have been developed to solve air pollution caused by existing gasoline and diesel engine vehicles.

Secondary cells may have a variety of shapes, such as a cylindrical shape, a polygonal shape, a pouch shape, and the like, according to the shape of a casing for an electrode assembly.

Typically, a cylindrical secondary cell uses a cylindrical aluminum casing and a polygonal secondary cell uses a polygonal aluminum casing. Further, a pouch-shaped secondary cell uses a pack-shaped pouch formed of an aluminum laminate thin film and is widely used in the art due its merits such as relatively light weight and excellent stability.

The pouch type secondary cell includes an electrode stack which is composed of a cathode, an anode and a separator interposed between the cathode and the anode, a pouch composed of an aluminum laminate film and sealing the stack received therein, and a plate-shaped electrode tap connected at one end thereof to the stack and exposed at the other end thereof to the outside to guide current to the outside.

It should be noted that the above description is provided for understanding of the background art and is not a description of a well-known technique in the art.

Conventionally, a stack electrode assembly is formed using a stacking apparatus by a stacking process in which a cathode, an anode, and a separator are sequentially stacked such that the separator is interposed between the cathode and the anode. However, since such a stacking process is very complicated, the stacking apparatus also has a very complicated configuration, thereby making it difficult to conduct maintenance of the apparatus and increasing manufacturing costs of the secondary cell.

Therefore, there is a need to solve such problems.

BRIEF SUMMARY

One aspect of the present disclosure is to provide a laminate structure generator capable of reducing manufacturing time of a secondary cell, and a stacking method and apparatus for a secondary cell including the same.

In accordance with one aspect of the present disclosure, a laminate structure generator includes: a first hand including a first palm and a first finger extending from the first palm; and a second hand including a second palm and a second finger extending from the second palm to cross the first finger. At least one the first hand and the second hand is moved in a direction of separating from the other.

The first finger may be detachably provided to the first palm and the second finger may be detachably provided to the second palm.

The first finger may include a first connecting portion protruding from the first palm towards the second palm and a first extended portion extending from the first connecting portion towards a side opposite the first palm, and the second finger may include a second connecting portion protruding from the second palm towards the first palm and a second extended portion extending from the second connecting portion towards a side opposite the second palm.

The first extended portion and the second extended portion may be disposed parallel to each other.

The first extended portion may be parallel to the first palm and the second extended portion may be parallel to the second palm.

At least one of the first hand and the second hand may be moved in a direction of separating from the other so as to maintain parallel arrangement between the first extended portion and the second extended portion.

The first finger may be composed of a plurality of first fingers arranged at constant intervals on the first palm and the second finger may be composed of a plurality of second fingers arranged at constant intervals on the second palm. Here, each of the second fingers is located between the first fingers.

Each of the first extended portion and the second extended portion may have a semispherical-shaped distal end.

In accordance with another aspect of the present disclosure, a stacking apparatus for a secondary cell includes: a guide roller guiding a film; and a laminate structure generator disposed parallel to the film vertically descended by the guide roller. Here, the laminate structure generator includes a first hand including a first palm and a first finger extending from the first palm, the first finger being disposed parallel to the film to face one side of the film; and a second hand including a second palm and a second finger extending from the second palm to cross the first finger, the second finger being disposed parallel to the film to face the other side of the film. At least one of the first hand and the second hand is moved in a direction of separating from the other.

The first finger may be detachably provided to the first palm and the second finger may be detachably provided to the second palm.

The first finger may include a first connecting portion protruding from the first palm towards the second palm and a first extended portion extending from the first connecting portion towards a side opposite the first palm, and the second finger may include a second connecting portion protruding from the second palm towards the first palm and a second extended portion extending from the second connecting portion towards a side opposite the second palm. Herein, the first extended portion and the second extended portion are disposed parallel to each other.

The first extended portion may be parallel to the first palm and the second extended portion may be parallel to the second palm.

At least one of the first hand and the second hand may be moved in a direction of separating from the other so as to maintain parallel arrangement between the first extended portion and the second extended portion.

The first finger may be composed of a plurality of first fingers arranged at constant intervals on the first palm and the second finger may be composed of a plurality of second fingers arranged at constant intervals on the second palm. Here, each of the second fingers is located between the first fingers.

Each of the first extended portion and the second extended portion may have a semispherical-shaped distal end.

The laminate structure generator may further include a support plate supporting the lowermost surface of the film to prevent the film from sagging when the film is folded in a Z-shape by movement of at least one of the first hand and the second hand.

The laminate structure generator may further include an electrode plate transfer device which inserts electrode plates between folded parts of the film when the film is folded in a Z-shape by movement of at least one of the first hand and the second hand.

The electrode plate transfer device may include a base on which the electrode plate is placed; and a transfer unit which transfers the electrode plate such that the electrode plate is placed between the folded parts of the film.

The transfer unit may include a transfer plate disposed to face one side of the electrode plate; a cylinder connected to the transfer plate; and a motor generating drive force to move the cylinder towards the electrode plate.

The base may be composed of a plurality of bases and the transfer unit may be composed of a plurality of transfer units. Here, the electrode plate transfer device may further include a connection beam connecting the bases to each other such that the bases are disposed at upper and lower sides to be parallel to each other.

The laminate structure generator may further include a pressing plate which compresses the uppermost surface of the film in a downward direction when the electrode plate is inserted between the folded parts of the film by the electrode plate transfer device.

The pressing plate may have a smaller width than the electrode plate.

In accordance with a further aspect of the present disclosure, a stacking method for a secondary cell includes: descending a film using a guide roller; disposing a first hand to be parallel to the film so as to face one side of the film while disposing a second hand to be parallel to the film so as to face the other side of the film; and moving at least one of the first hand and the second hand to separate from the other such that the film is folded in a Z shape.

The first hand may include a first palm and a first finger extending from the first palm towards the second hand and disposed parallel to the film to face the one side of the film. Further, the second hand may include a second palm and a second finger extending from the second palm towards the first hand to cross the first finger. Here, the second finger is disposed parallel to the film to face the other side of the film.

The moving at least one of the first hand and the second hand may include separating the first finger and the second finger from each other in a parallel state.

The first finger may be composed of a plurality of first fingers arranged at constant intervals on the first palm and the second finger may be composed of a plurality of second fingers arranged at constant intervals on the second palm and each being located between the first fingers. Further, the film is folded in a Z shape by movement of the first fingers and the second fingers.

The method may further include supporting the lowermost surface of the film using a support plate to prevent the film from sagging when the film is folded in a Z-shape.

The method may further include inserting an electrode plate between folded parts of the film using an electrode plate transfer device when the film is folded in a Z-shape.

The method may further include compressing the uppermost surface of the film in a downward direction using a pressing plate when the electrode plate is inserted between the folded parts of the film.

The method may further include moving the first hand and the second hand rearwards when the uppermost surface of the film is compressed.

BRIEF DESCRIPTION OF THE DRAWINGS

The above and other aspect, features and advantages of the present disclosure will become apparent from the following description of embodiments given in conjunction with the accompanying drawings, in which.

DETAILED DESCRIPTION

Embodiments of the present disclosure will now be described in detail with reference to the accompanying drawings. It should be noted that the drawings are not to precise scale and may be exaggerated in thickness of lines or size of components for descriptive convenience and clarity only.

Furthermore, the terms used herein are defined by taking functions of the present disclosure into account and can be changed according to user or operator's custom or intention. Therefore, definition of the terms should be made according to the overall disclosure set forth herein.

Figure 1:
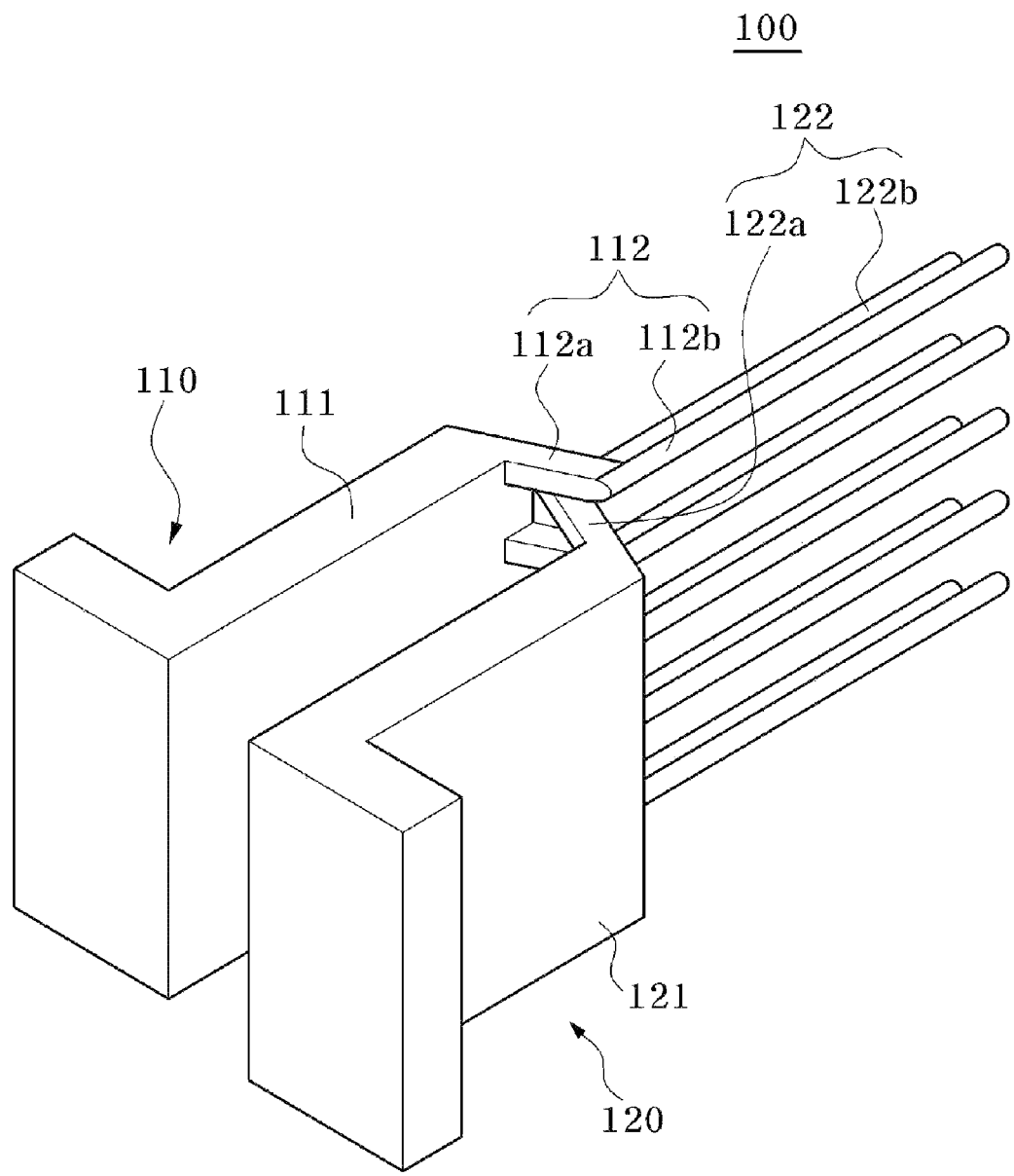
FIG. 1 is a perspective view of a laminate structure generator according to an exemplary embodiment of the present disclosure.
Figure 2:
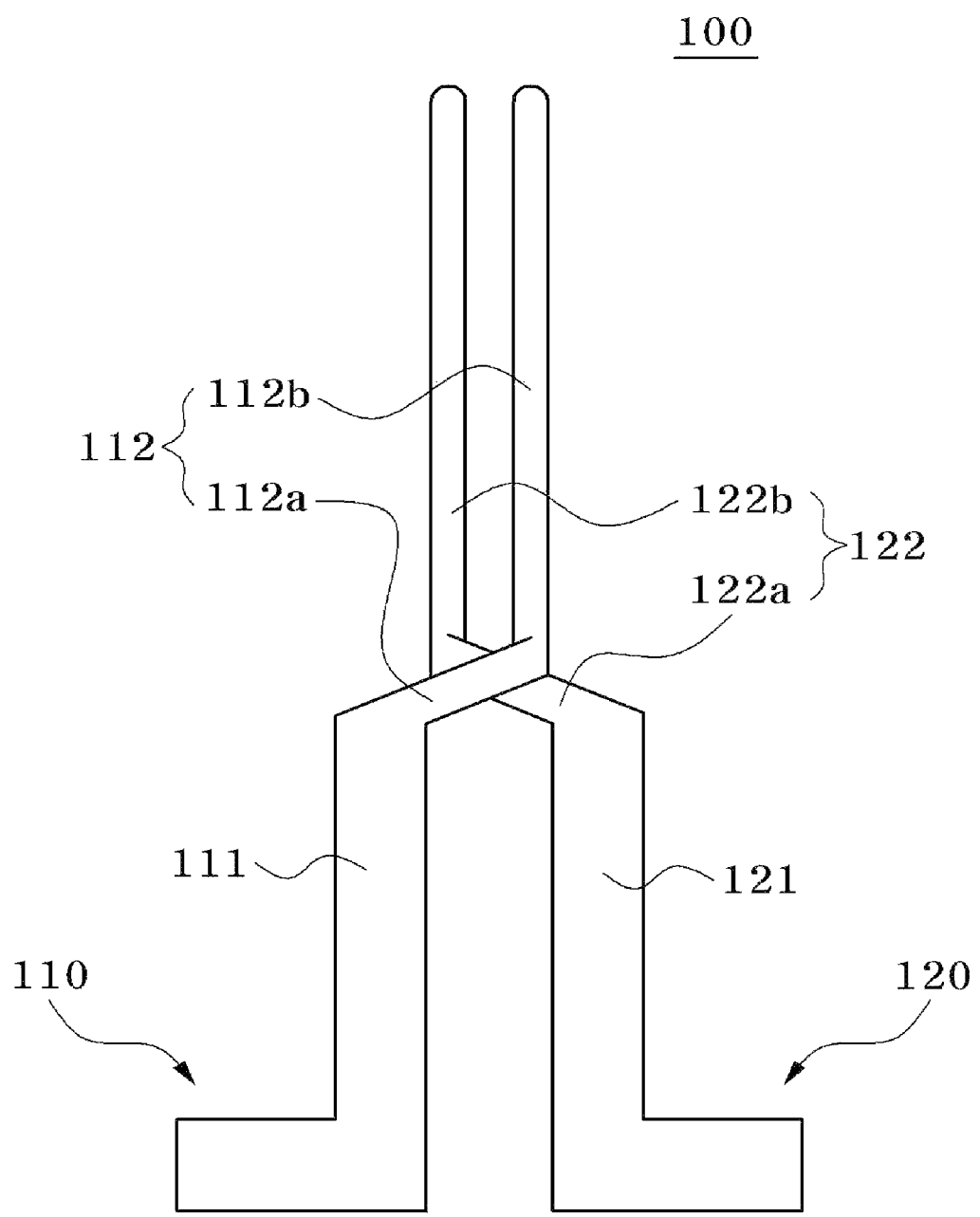
FIG. 2 is a top view of the laminate structure generator according to the exemplary embodiment of the present disclosure.
Figure 3:
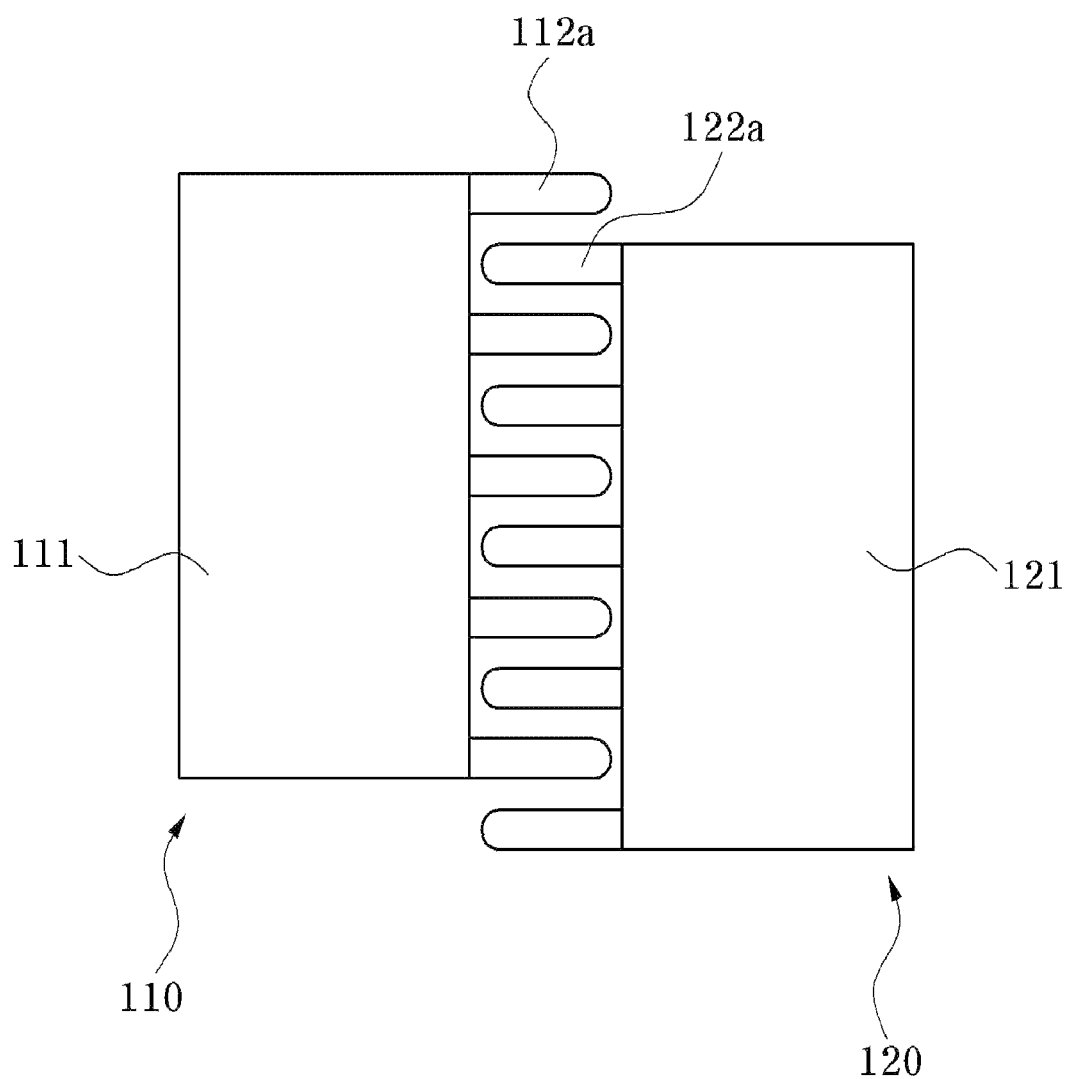
FIG. 3 is a rear view of the laminate structure generator according to the exemplary embodiment of the present disclosure.
Figure 4:
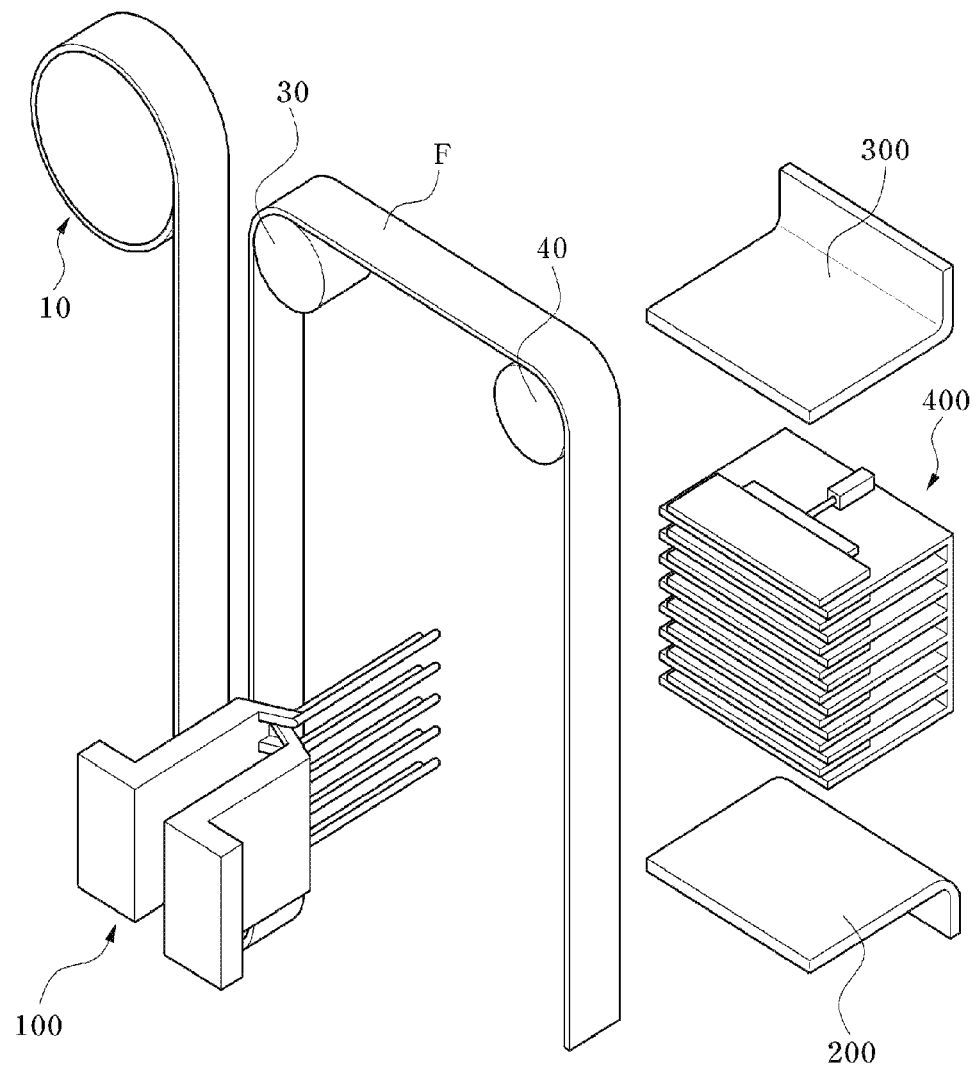
FIG. 4 is a diagram of a stacking apparatus according to an exemplary embodiment of the present disclosure.

Referring to FIG. 1 to FIG. 3, a laminate structure generator according to an exemplary embodiment will be described. The laminate structure generator 100 includes a first hand 110 and a second hand 120.

Like the hand of a person, the first hand 110 generally includes a first palm 111 and first fingers 112. The second hand 120 also includes a second palm 121 and second fingers 122.

The first finger 112 includes a first connecting portion 112a and a first extended portion 112b. The first connecting portion 112a protrudes from one end of the first palm 111 towards the second palm 121.

The first extended portion 112b extends from a distal end of the first connecting portion 112a towards a side opposite the first palm 111 to be parallel to the first palm 111. The first extended portion 112b has a semi-spherically rounded distal end.

The first fingers 112 are arranged at constant intervals. Although the first palm 111 is illustrated as including five first fingers 112 in this embodiment, the present disclosure is not limited thereto and the number of first fingers is determined according to manufacturing conditions. For example, the first palm 111 may include four or less first fingers 112, or otherwise, six or more first fingers 112.

The first palm 111 is formed at one end thereof with a plurality of first connecting portions 112a and a plurality of first extended portions 112b arranged at constant intervals. Namely, referring to FIG. 2, the first hand 110 is composed of the first palm 111 extending in the vertical direction, the first connecting portions 112a each protruding rightwards from an upper end of the first palm 111, and the first extended portions 112b each extending upwards from a right end of the first connecting portion 112a.

The first fingers 112 may be detachably coupled to the first palm 111. Accordingly, when there is a change in the size of a film or electrode plate stacked between folded parts of the film, such as a change in the width or thickness of the film or the electrode plate, the first fingers 112 can be replaced by new first fingers 112 having a shape and a size corresponding to the size of the film or the electrode plate. In other words, the size change of the film or the electrode plate can be suitably overcome simply by replacing the first fingers 112, instead of replacing the entirety of the laminate structure generator 100 including the first hand 110, thereby improving operation flexibility and productivity.

The first hand 110 is coupled to a drive unit (not shown) for generating drive force and may be horizontally or vertically moved by operation of the drive unit. Here, the movement of the first hand 110 may be limited to a certain direction by a guide rail (not shown) which guides a moving path. In this embodiment, the first hand 110 is moved in a direction of gradually increasing a distance from the second hand 120.

The second finger 122 includes a second connecting portion 122a and a second extended portion 122b. The second connecting portion 122a protrudes from one end of the second palm 121 towards the first palm 111. As such, the second connecting portion 122a protrudes towards the first palm 111 and the first connecting portion 112a protrudes towards the second palm 121, so that the second connecting portion 122a and the first connecting portion 112a are disposed to cross each other.

The second extended portion 122b extends from a distal end of the second connecting portion 122a towards a side opposite the second palm 121 to be parallel to the second palm 121. The second extended portion 122b has a semi-spherically rounded distal end.

The second extended portion 122b and the first extended portion 112b are disposed parallel to each other. Such parallel arrangement of the first extended portion 112b and the second extended portion 122b is maintained when the first hand 110 and the second hand 120 are moved in a direction of separating from each other.

Referring to FIG. 2, the second hand 120 is composed of the second palm 121 extending in the vertical direction, the second connecting portions 122a each protruding leftwards from an upper end of the second palm 121, and the second extended portions 122b each extending upwards from a left end of the second connecting portion 122a.

The plurality of second fingers 122 are arranged at constant intervals. Although the second palm 121 is illustrated as including five second fingers 122 in this embodiment, the present disclosure is not limited thereto and the number of second fingers 122 is determined according to manufacturing conditions. For example, the second palm 121 may include four or less second fingers 122, or otherwise, six or more second fingers 122. As such, the second palm 121 is formed at one end thereof with a plurality of second connecting portions 122a and a plurality of second extended portions 122b arranged at constant intervals.

Here, each of the second fingers 122 may be located between the first fingers 112. In other words, as shown in FIG. 3, each of the second connecting portions 122a is located between the first connecting portions 112a and each of the first connecting portions 112a is located between the second connecting portions 122a.

As in the first fingers 112, the second fingers 122 may be detachably coupled to the second palm 121. Accordingly, when there is a change in the size of a film or electrode plate stacked between folded parts of the film, such as a change in the width or thickness of the film or the electrode plate, the second fingers 122 can be replaced by new second fingers 122 having a shape and a size corresponding to the size of the film or the electrode plate. In other words, the size change of the film or the electrode plate can be suitably overcome simply by replacing the second fingers 122, instead of replacing the entirety of the laminate structure generator 100 including the second hand 120, thereby improving operation flexibility and productivity.

As in the first hand 110, the second hand 120 is coupled to a drive unit (not shown) for generating drive force and may be horizontally or vertically moved by operation of the drive unit. Here, the movement of the second hand 120 may be limited to a certain direction by the guide rail (not shown) which guides a moving path. In this embodiment, the second hand 120 is moved in a direction of gradually increasing a distance from the first hand 110.

Next, a stacking apparatus according to an exemplary embodiment of the present disclosure will be described with reference to FIGS. 1 to 13.

The stacking apparatus for a secondary cell according to this embodiment includes an uncoiler 10, a tension roller 20, guide rollers 30, 40, a laminate structure generator 100, a support plate 200, a pressing plate 300, and an electrode plate transfer device 400.

The uncoiler 10 may be rotated about a rotational shaft (not shown) to uncoil a film F, which is coiled in a roll shape. The uncoiler 10 has a roller shape and the film F uncoiled from the uncoiler 10 is moved towards a first guide roller 30, which guides the film F to a post-process.

The tension roller 20 is disposed between the uncoiler 10 and the first guide roller 30 to maintain suitable tension of the film F by applying pressure to the film F while the film F is uncoiled from the uncoiler 10 and guided by the first guide roller 30.

The guide rollers 30, 40 include the first guide roller 30 and a second guide roller 40. The first guide roller 30 guides the film F to a post-process while the tension roller 20 applies tension to the film F. The first guide roller 30 has a typical roller shape and is rotatably disposed to help transfer the film F.

The second guide roller 40 guides the film F guided by the first roller 30 to descend vertically. In other words, the film F is vertically suspended from the second guide roller 40 towards the ground by gravity after passing through the second guide roller 40.

The laminate structure generator 100 includes a first hand 110 and a second hand 120 as described above, and is disposed below the second guide roller 40.

According to a stacking process, the laminate structure generator 100 sequentially moves to a first position (see FIG. 4) where the laminate structure generator 100 is separated a predetermined distance from the film F vertically suspended from the second guide roller 40, a second position (see FIG. 7) where the laminate structure generator 100 is moved towards the film F such that the film F is located between the first extended portions 112b and the second extended portions 122b, a third position (see FIG. 9) where the first hand 110 and the second hand 120 are moved to separate the first extended portions 112b and the second extended portions 122b from each other, and a fourth position where the first hand 110 and the second hand 120 are moved backwards to allow the first extended portions 112b and the second extended portions 122b to be separated from the film F which is folded in a Z shape by the first extended portions 112b and the second extended portions 122b. Then, the laminate structure generator 100 at the fourth position is moved again towards the first position to prepare a subsequent stacking process.

In the laminate structure generator 100 at the first position, the first hand 110 and the second hand 120 are disposed to face each other. The first palm 111 of the first hand 110 and the second palm 121 of the second hand 120 are disposed to face each other, and the first fingers 112 extending from the first palm 111 and the second fingers 122 extending from the second palm 121 are symmetrically disposed in a top view (see FIG. 2).

In the laminate structure generator 100 at the second position, the film F is located between the first extended portion 112b and the second extended portion 122b. At the second position, the laminate structure generator 100 is moved in a forward direction from the first position towards the film F.

To prevent the film F from being damaged by the first extended portions 112b and the second extended portions 122b while the laminate structure generator 100 is moved from the first position to the second position, the first extended portions 112b and the second extended portions 122b have a semispherical-shaped distal end. Accordingly, there is no likelihood of tearing or damaging the film F even when the film F is brought into contact with the distal ends of the first extended portions 112b and the second extended portions 122b during movement of the laminate structure generator 100.

At the second position, the first extended portions 112b are parallel to the second extended portions 122b. The first extended portions 112b are disposed parallel to the film F to face one side of the film F, and the second extended portions 122b are disposed parallel to the other side of the film F to face the other side of the film F. Namely, the first extended portions 112b and the second extended portions 122b are disposed parallel to each other with respect to the film F vertically suspended from the second guide roller towards the ground.

The first extended portion 112b and the second extended portion 122b may be detachably coupled to the first connecting portion 112a and the second connecting portion 122a to adjust the lengths of the first extended portion 112b and the second extended portion 122b according to the width of the film F.

In the laminate structure generator 100 at the third position, the first hand 110 and the second hand 120 are separated from each other, so that the film F is straddled in a Z shape on outer peripheries of the first extended portion 112b and the second extended portion 122b.

Although the first hand 110 and the second hand 120 are illustrated as being moved at the same time in a direction of separating from each other in this embodiment, the present disclosure is not limited to this configuration. It should be understood that only one of the first hand 110 and the second hand 120 may be moved in a direction of separating from the other.

When the first hand 110 and the second hand 120 are moved in a direction of separating from each other from the second position to the third position, the first extended portions 112b and the second extended portions 122b are maintained parallel to each other. Accordingly, when the film F is bent into the Z-shape between the first extended portions 112b and the second extended portions 122b, a constant width is maintained from the uppermost surface of the film F to the lowermost surface thereof.

In this embodiment, since the first and second hands 110, 120 includes the plurality of first and second extended portions 112b, 122b, respectively, the film F is continuously folded in a Z shape from the uppermost surface to the lowermost surface of the film between the first and second extended portions 112b, 122b.

Then, the first hand 110 and the second hand 120 are moved rearwards from the third position to the fourth position. At the fourth position, the film F having an anode plate (n) and a cathode plate (p) sequentially stacked thereon is supported upwards by the support plate 200 while being compressed downwards by the pressing plate 300. Thus, when the laminate structure generator 100 is moved rearwards, the film F having electrode plates stacked thereon is maintained in an aligned state.

Figure 9:
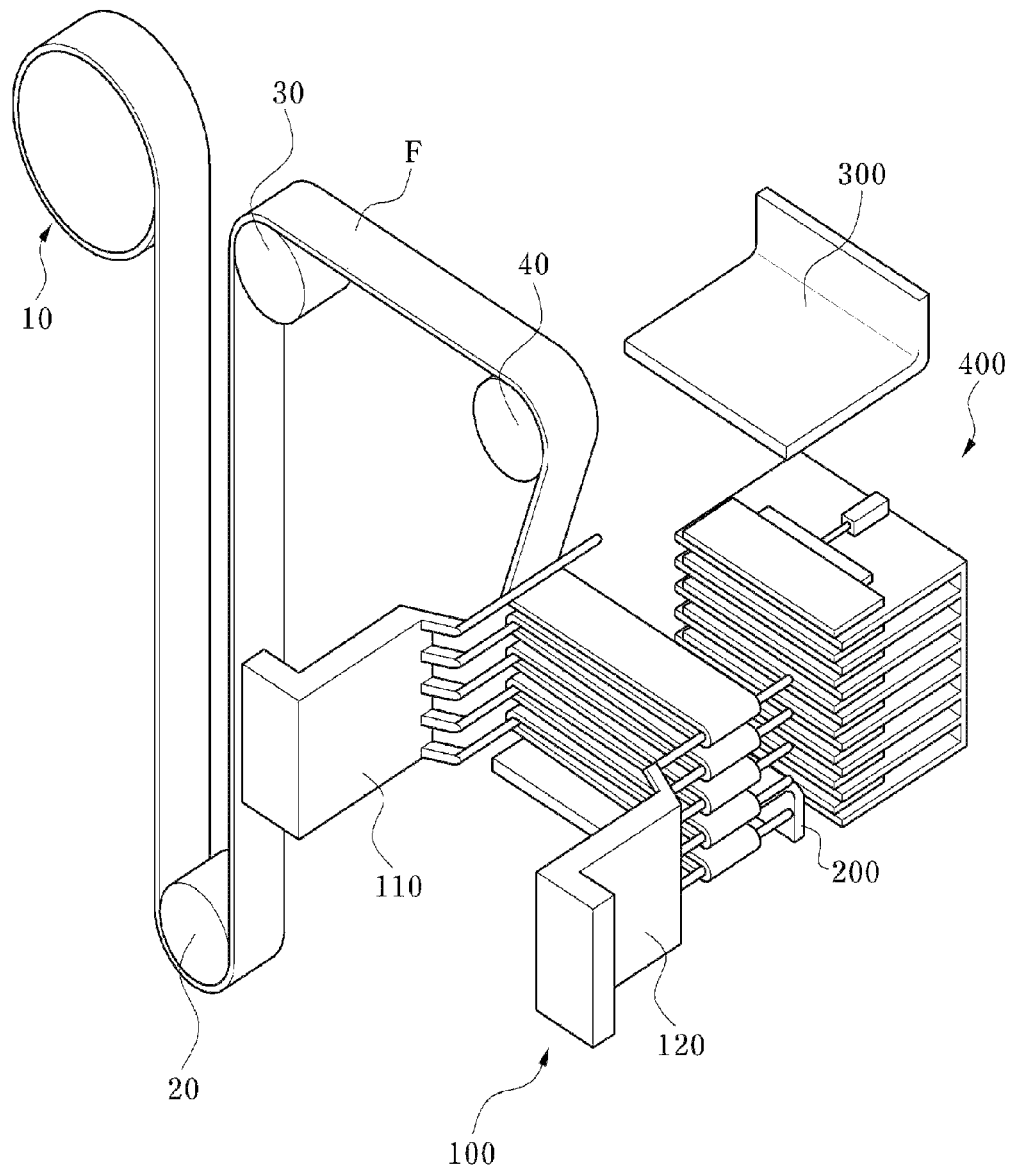
FIG. 9 is a view of the laminate structure generator moved to a third position in the stacking apparatus according to the exemplary embodiment of the present disclosure.

The support plate 200 supports the lowermost surface of the film F to prevent the film F from sagging when the film S is folded in a Z shape by movement of the first hand 110 and the second hand 120 (see FIG. 9).

The support plate 200 has a smaller width than the distance between the first extended portion 112b and the second extended portion 122b at the third position to prevent interference with the first extended portion 112b and the second extended portion 122b when the support plate 200 supports the lowermost surface of the film F. An upper surface of the support plate 200 contacting the lowermost surface of the film F may be a flat surface.

The support plate 200 is separated a distance from the film F when the laminate structure generator 100 is located at the second position. Then, the support plate 200 is moved towards the film F as soon as or immediately after the laminate structure generator 100 is moved to the third position.

The support plate 200 is coupled to a drive unit (not shown) for generating drive force and may be horizontally or vertically moved by operation of the drive unit. Here, the movement of the support plate 200 may be limited to a certain direction by a guide rail (not shown) which guides a moving path.

Figure 10:
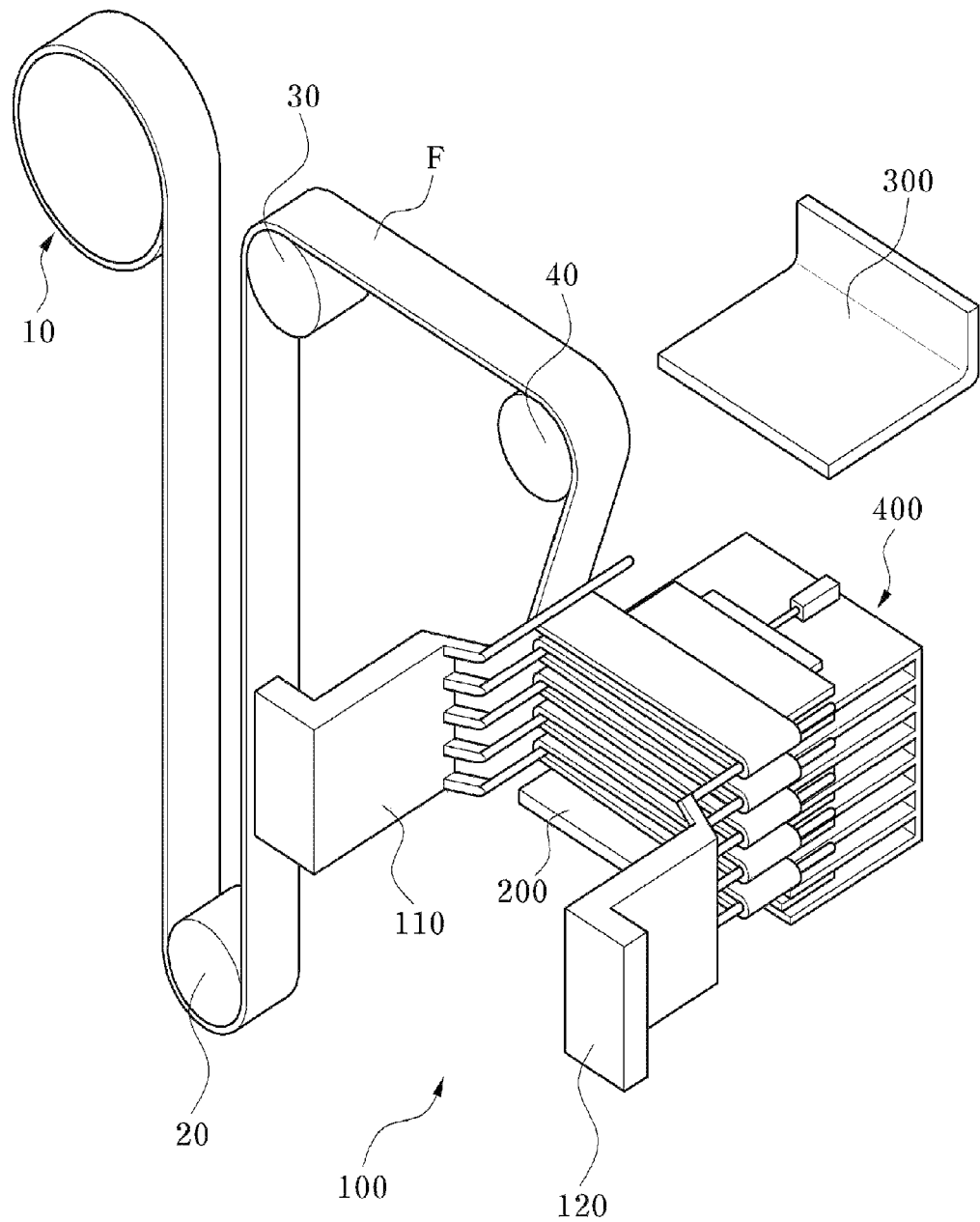
FIG. 10 is a view of the electrode plate transfer device of the stacking apparatus according to the exemplary embodiment of the present disclosure, which inserts electrode plates between folded parts of a film.

As the film F is folded in a Z shape by movement of the first and second hands 110, 120, the electrode plate transfer device 400 inserts the anode plate (n) and the cathode plate (p) between the folded parts of the film F (see FIG. 10).

Figure 5:
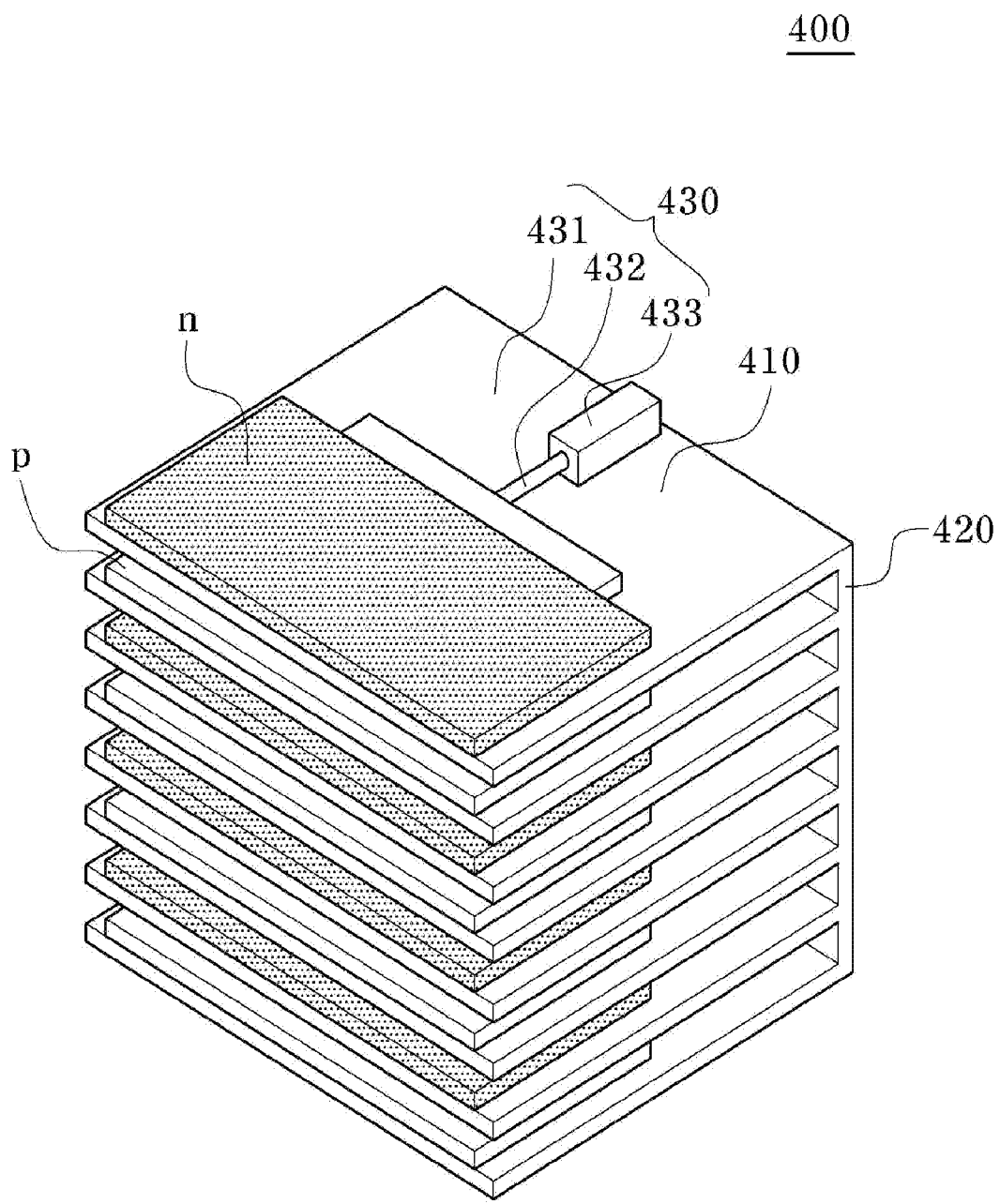
FIG. 5 is a perspective view of an electrode plate transfer device of the stacking apparatus according to the exemplary embodiment of the present disclosure.
Figure 6:
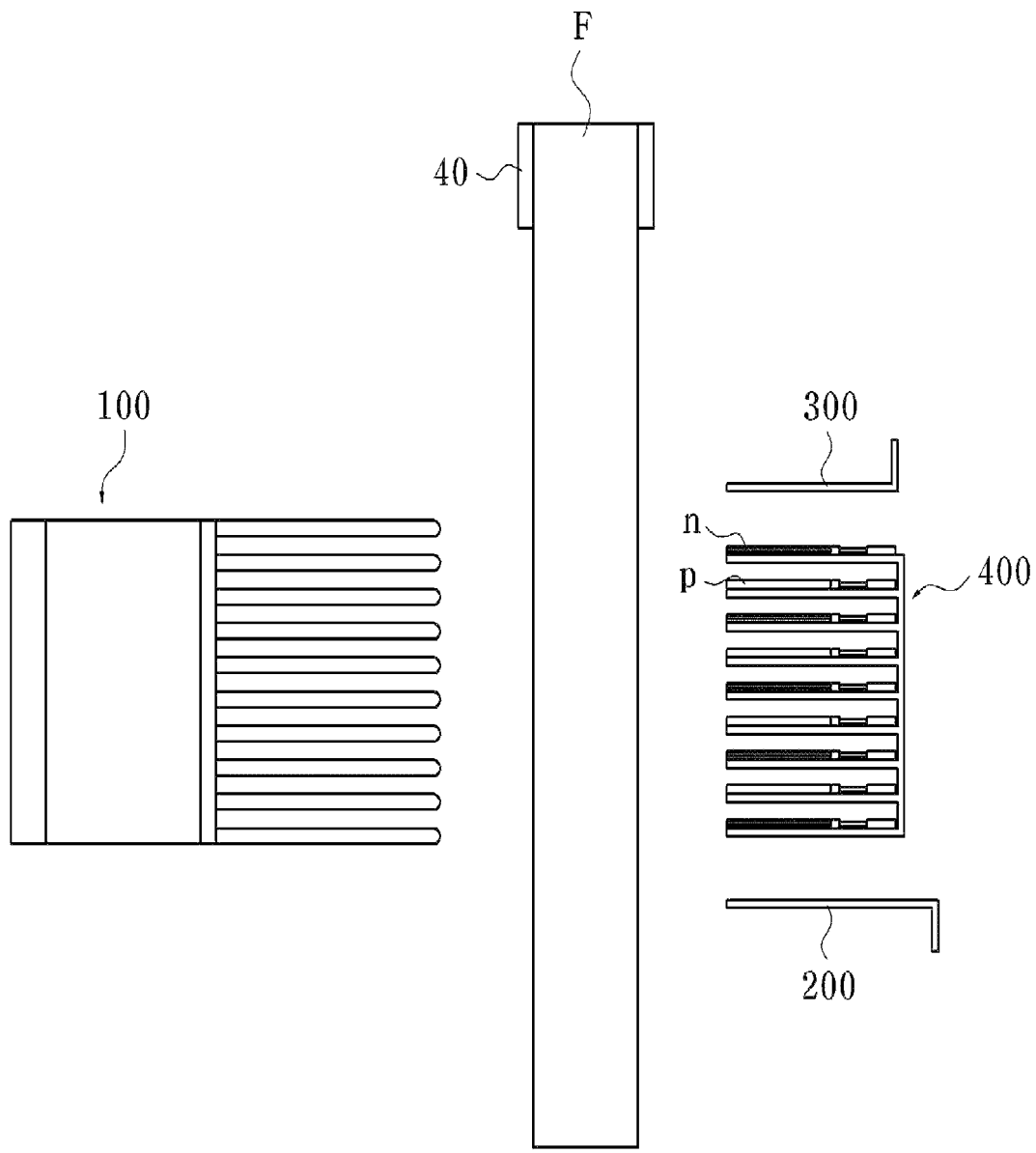
FIG. 6 is a side view of the stacking apparatus according to the exemplary embodiment of the present disclosure.
Figure 7:
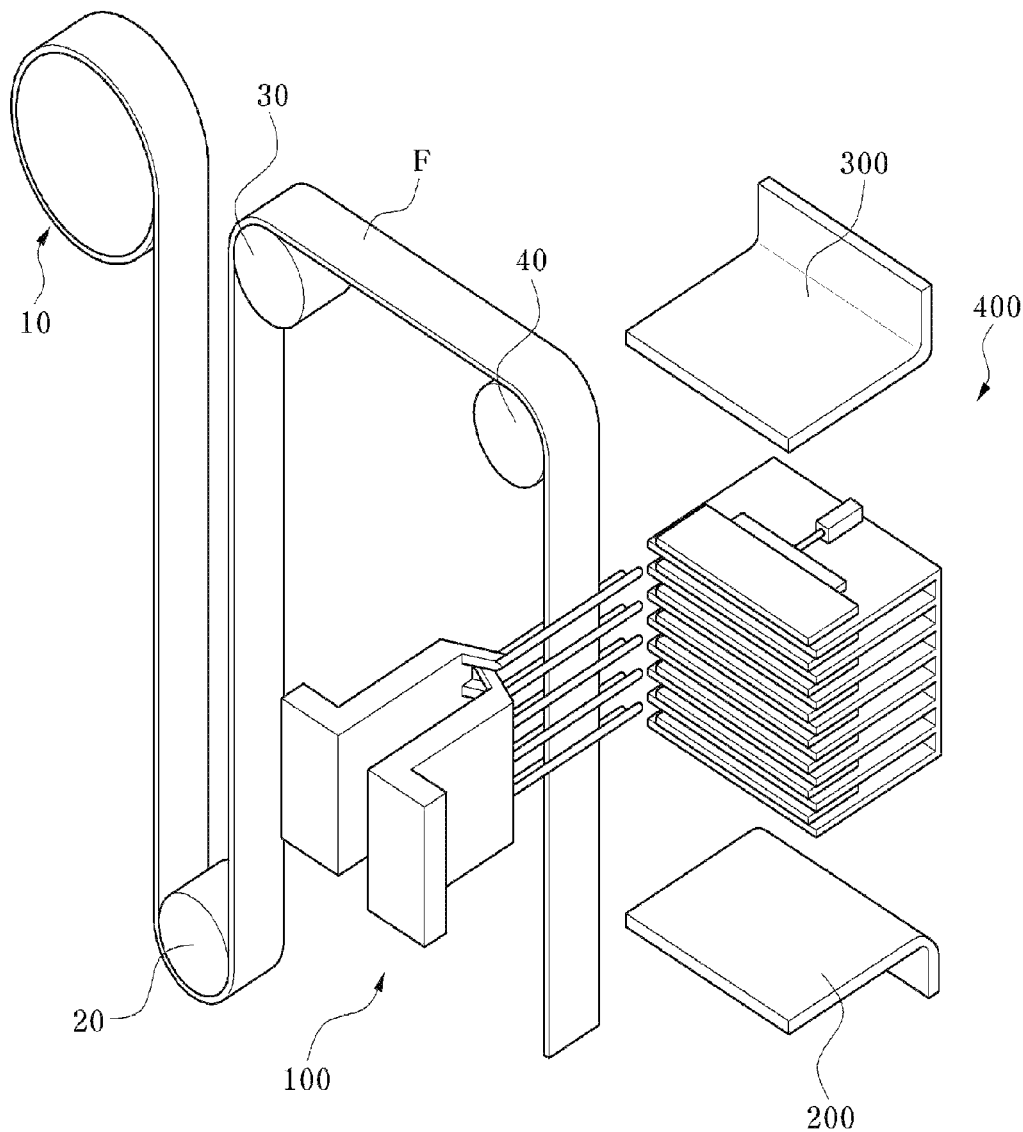
FIG. 7 is a view of a laminate structure generator moved to a second position in the stacking apparatus according to the exemplary embodiment of the present disclosure.
Figure 8:
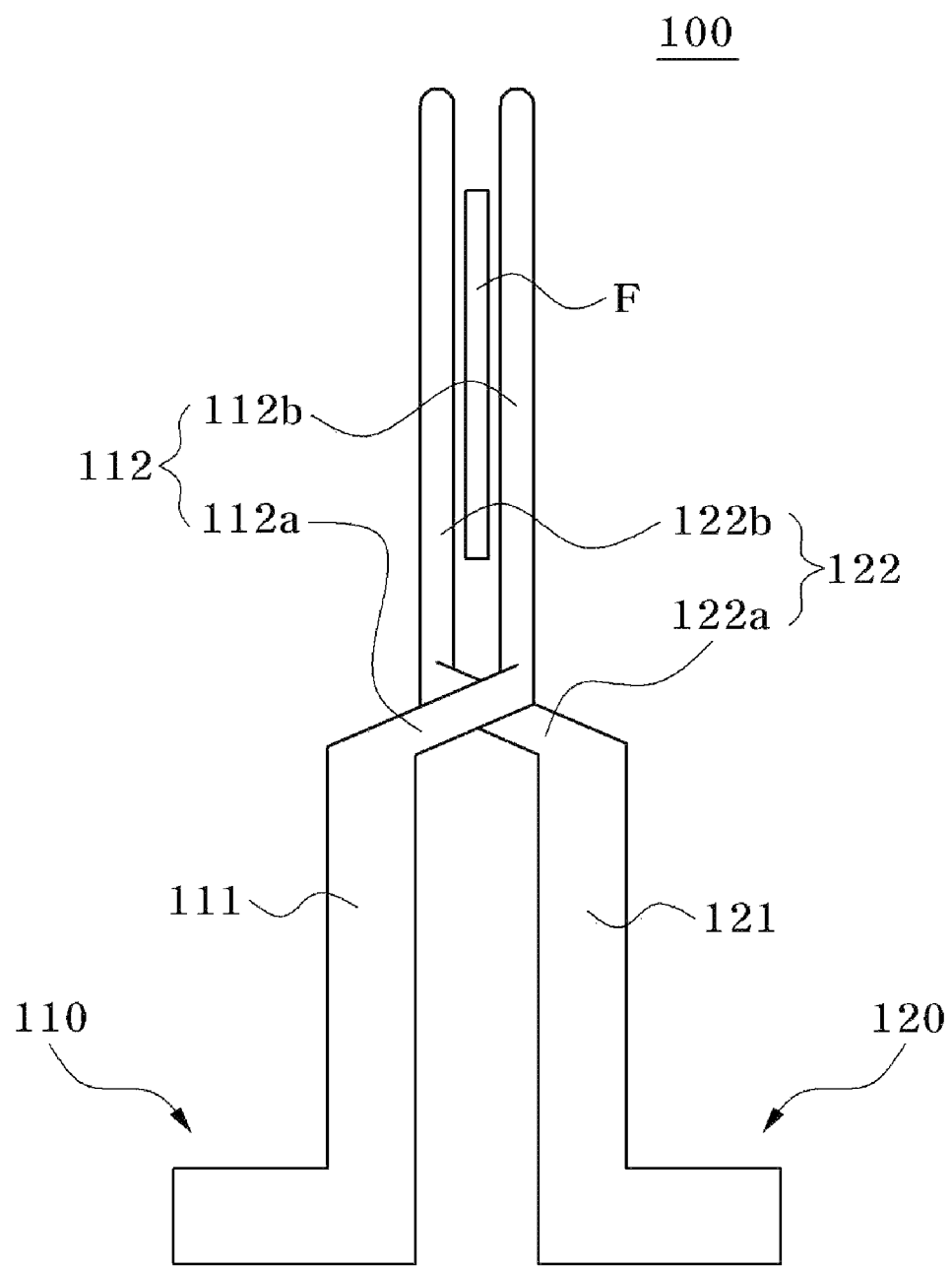
FIG. 8 is a plan view of the laminate structure generator of FIG. 7.

The electrode plate transfer device 400 includes bases 410, a connection beam 420, and a transfer unit 430 (see FIGS. 5 and 6).

On the bases 410, electrode plates such as anode plates (n) and cathode plates (p) to be inserted into the film F folded in a Z shape are placed. The bases 410 are arranged parallel to each other from an upper side to a lower side, and the anode plates (n) and the cathode plates (p) are alternately placed on the bases 410. For example, when an anode plate (n) is placed on the uppermost base, a cathode plate (p) is placed on a second base under the uppermost base, and another anode plate (n) is placed on a third base under the second base.

The electrode plate transfer device 400 is coupled to a drive unit (not shown) for generating drive force and may be horizontally or vertically moved by operation of the drive unit. Here, the movement of the electrode plate transfer device 400 may be limited to a certain direction by the guide rail (not shown) which guides a moving path.

The connection beam 420 connects the bases 410 to each other. Since an upper base 410 is connected to a lower base 410 via the connection beam 420, all of the bases 410 may be simultaneously moved by driving a single drive unit.

The transfer unit 430 includes a transfer plate 431, a cylinder 432 and a motor 433, and pushes the electrode plates (n, p) placed on the base 410 such that the electrode plates (n, p) can be inserted into the folded parts of the film.

The transfer plate 431 is disposed on the base 410 so as to face a rear side of a corresponding electrode plate (n or p). The cylinder 432 is connected at both ends thereof to the motor 433 and the transfer plate 431, respectively, and transfers drive force from the motor 433 to the transfer plate 431.

Figure 11:
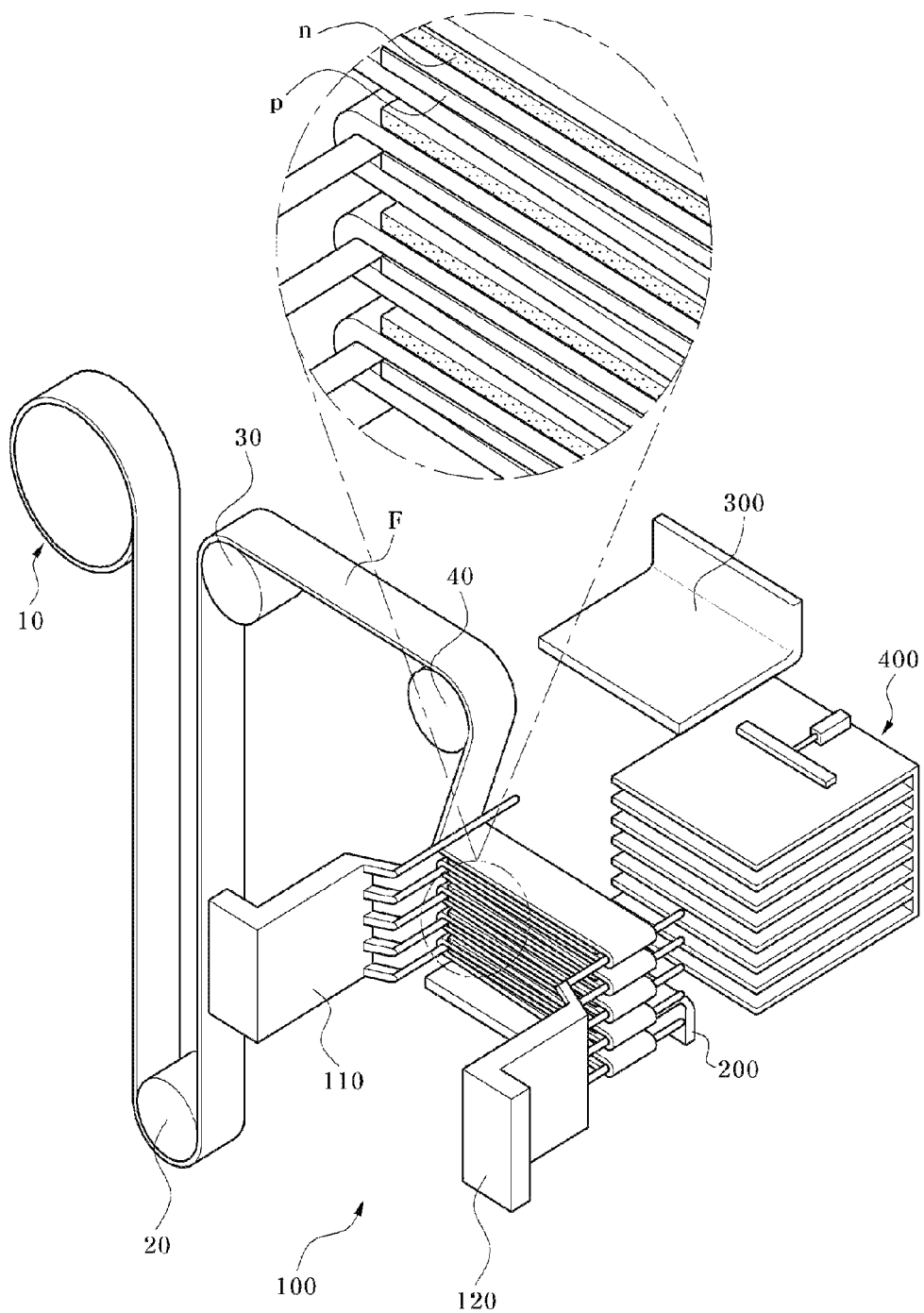
FIG. 11 shows the electrode plates inserted between the folded parts of the film by the electrode plate transfer device of the stacking apparatus according to the exemplary embodiment of the present disclosure.

As the cylinder 432 is moved towards the corresponding electrode plate (n or p) by operation of the motor 433, the corresponding electrode plate (n or p) is pushed so as to be positioned between the folded parts of the film F by the transfer plate 431 (see FIG. 11).

When the laminate structure generator 100 is placed at the second position, the electrode plate transfer device 400 is separated a distance from the film F. Then, the laminate structure generator 100 is moved towards the film F as soon as or immediately after the laminate structure generator 100 is moved to the third position.

Figure 12:
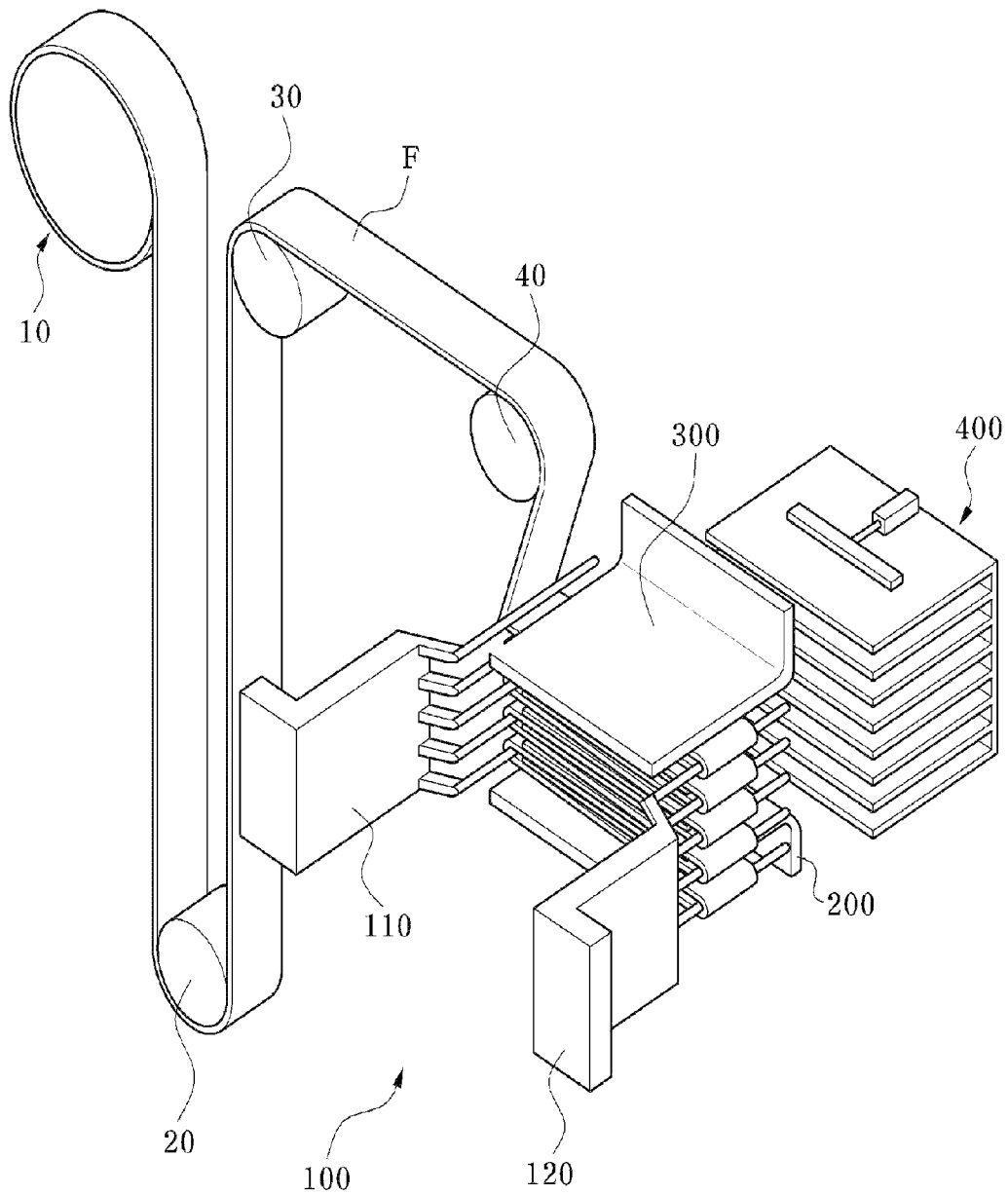
FIG. 12 is a view of a pressing plate of the stacking apparatus according to the exemplary embodiment of the present disclosure, which presses the film.
Figure 13:
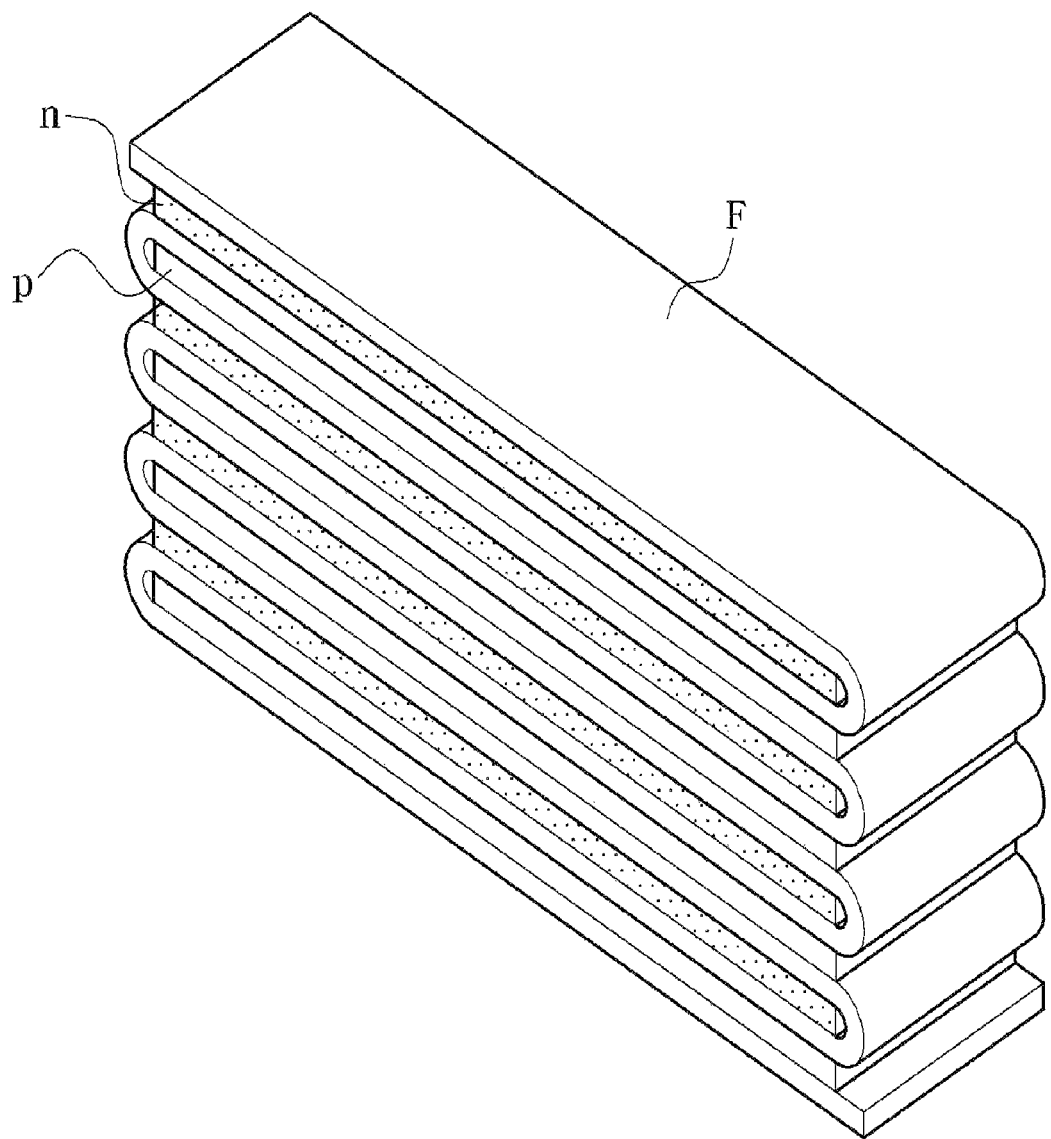
FIG. 13 shows electrode plates stacked between the folded parts of the film by the stacking apparatus according to the exemplary embodiment of the present disclosure.
Figure 14:
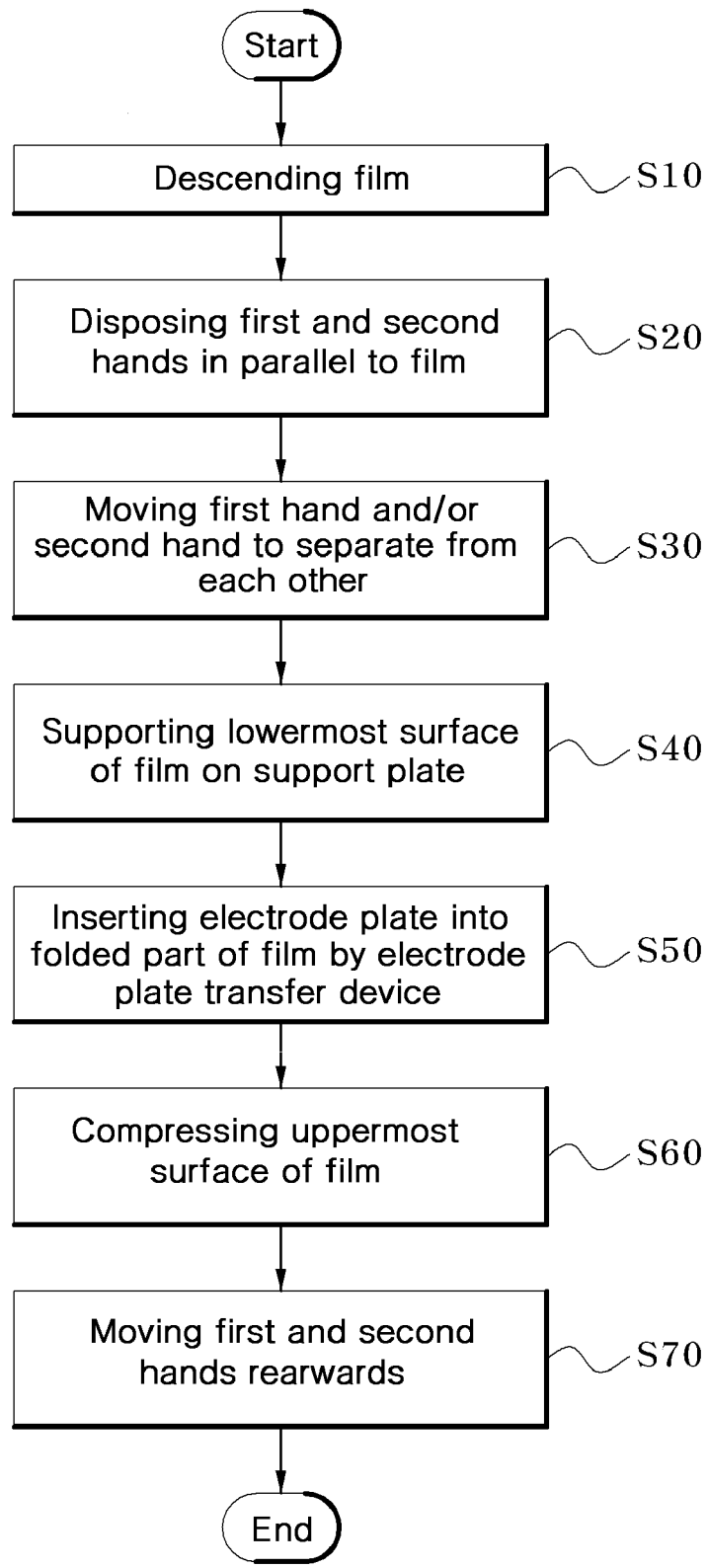
FIG. 14 is a flowchart of a stacking method for a secondary cell according to an exemplary embodiment of the present disclosure.

The pressing plate 300 compresses the uppermost surface of the film F in a downward direction when the electrode plates (n, p) are placed on the film F folded in a Z-shape (see FIG. 12).

The pressing plate 300 has a smaller width than the distance between the first extended portion 112b and the second extended portion 122b at the third position to prevent interference with the first extended portion 112b and the second extended portion 122b when the pressing plate 300 compresses the uppermost surface of the film F. A lower surface of the pressing plate 300 contacting the uppermost surface of the film F may be a flat surface.

The pressing plate 300 is separated a distance from the film F before the electrode plates (n, p) are inserted between the folded parts of the film F by the electrode plate transfer device 400. Then, the pressing plate 300 is moved towards the film F as soon as or immediately after the electrode plates (n, p) are placed between the folded parts of the film F.

The pressing plate 300 is coupled to a drive unit (not shown) for generating drive force and may be horizontally or vertically moved by operation of the drive unit. Here, the movement of the pressing plate 300 may be limited to a certain direction by the guide rail (not shown) which guides a moving path.

Next, a stacking method for a secondary cell according to one exemplary embodiment of the present disclosure will be described with reference to FIGS. 1 to 14.

When uncoiled from the uncoiler 10, a film F is guided to the second guide roller 40 through the tension roller 20 and the first guide roller 30. After passing through the second guide roller 40, the film F is vertically suspended from the second guide roller 40 towards the ground, in S10 (see FIG. 4).

Then, the laminate structure generator 100 is moved to position the first hand 110 and the second hand 120 to be parallel to the film F in S20. The first extended portions 112b of the first hand 110 are disposed parallel to the film F to face one side of the film F, and the second extended portions 122b of the second hand 120 are disposed parallel to the film F to face the other side of the film F. That is, the first extended portions 112b and the second extended portions 122b are disposed parallel to the film F (see FIGS. 7 and 8).

Then, the first hand 110 and the second hand 120 are moved to separate from each other in S30. As the first hand 110 and the second hand 120 are moved to separate from each other, the film F is straddled in a Z-shape on outer peripheries of the first extended portions 112b and the second extended portions 122b (see FIG. 9). When the first hand 110 and the second hand 120 are moved, the first extended portions 112b and the second extended portions 122b are maintained parallel to each other.

Then, the support plate 200 is moved to support the lowermost surface of the film F, which is folded in a Z shape by the first extended portions 112b and the second extended portions 122b, in S40 (see FIG. 9). As a result, it is possible to prevent the film F from sagging due to gravity. The support plate 200 may be moved to support the film F as soon as or immediately after the laminate structure generator 100 is moved to the third position.

Next, electrode plates, that is, anode plates (n) and cathode plates (p), are inserted between the folded parts of the film F by the electrode plate transfer device 400 in S50 (see FIGS. 10 and 11). The electrode plates (n, p) placed on the bases 410 are transferred towards the film F by the transfer unit 430 such that the anode plates (n) and the cathode plates (p) are alternately placed between the folded parts of the film F. The electrode plate transfer device 400 may be moved as soon as or immediately after the laminate structure generator 100 is moved to the third position.

When the electrode plates (n, p) are placed between the folded parts of the film F, the uppermost surface of the film F is compressed by the pressing plate 300 in S60 (see FIG. 12). Movement of the pressing plate for compressing the film F in the downward direction may be carried out as soon as or immediately after the electrode plates (n, p) are placed between the folded parts of the film F.

When the film F having the anode plates (n) and the cathode plates (p) sequentially stacked thereon is supported by the support plate 200 while being compressed by the pressing plate 300, the laminate structure generator 100 is moved rearwards in S70. Since the film F is brought into close contact with the electrode plates (n, p) by the support plate 200 and the pressing plate 300, the film F having the electrode plates (n, p) stacked thereon is maintained in an aligned state during movement of the laminate structure generator 100 (see FIG. 13).

As such, according to the exemplary embodiments, a plurality of electrode plates can be stacked on a film through single movement of the laminate structure generator, thereby enabling simplification of a process of manufacturing a secondary cell.

In addition, according to the exemplary embodiments, it is possible to achieve cost reduction in manufacture of a secondary cell by reducing manufacturing time.

Furthermore, the apparatus according to the exemplary embodiments has a simple structure, thereby reducing maintenance costs of the stacking apparatus for a secondary cell.

Although some embodiments have been described in the present disclosure, it should be understood that the embodiments are given by way of illustration only and do not limit the scope of the present disclosure, and that various modifications, variations, and alterations can be made by a person having ordinary knowledge in the art without departing from the spirit and scope of the present disclosure, which are limited only by the accompanying claims and equivalents thereof.

What is claimed is:

1. A stacking apparatus for a secondary cell, comprising:
a guide roller guiding a film; and
a laminate structure generator disposed parallel to the film vertically descended by the guide roller, the laminate structure generator comprising:
a first hand including a first palm and a first finger extending from the first palm, the first finger being disposed parallel to the film to face one side of the film; and
a second hand including a second palm and a second finger extending from the second palm to cross the first finger, the second finger being disposed parallel to the film to face the other side of the film, at least one of the first hand and the second hand being moved in a direction of separating from the other.

2. The stacking apparatus of claim 1, wherein the first finger is detachably provided to the first palm and the second finger is detachably provided to the second palm.

3. The stacking apparatus of claim 1, wherein the first finger comprises a first connecting portion protruding from the first palm towards the second palm and a first extended portion extending from the first connecting portion towards a side opposite the first palm, and the second finger comprises a second connecting portion protruding from the second palm towards the first palm and a second extended portion extending from the second connecting portion towards a side opposite the second palm, the first extended portion and the second extended portion being disposed parallel to each other.

4. The stacking apparatus of claim 3, wherein the first extended portion is parallel to the first palm and the second extended portion is parallel to the second palm.

5. The stacking apparatus of claim 3, wherein at least one of the first hand and the second hand is moved in a direction of separating from the other so as to maintain parallel arrangement between the first extended portion and the second extended portion.

6. The stacking apparatus of claim 3, wherein the first finger is composed of a plurality of first fingers arranged at constant intervals on the first palm and the second finger is composed of a plurality of second fingers arranged at constant intervals on the second palm, each of the second fingers being located between the first fingers.

7. The stacking apparatus of claim 6, wherein each of the first extended portion and the second extended portion has a semispherical-shaped distal end.

8. The stacking apparatus of claim 1, further comprising: a support plate supporting the lowermost surface of the film to prevent the film from sagging when the film is folded in a Z-shape by movement of at least one of the first hand and the second hand.

9. The stacking apparatus of claim 8, further comprising: an electrode plate transfer device which inserts an electrode plate between folded parts of the film when the film is folded in a Z-shape by movement of at least one of the first hand and the second hand.

10. The stacking apparatus of claim 9, wherein the electrode plate transfer device comprises: a base on which the electrode plate is placed; and a transfer unit which transfers the electrode plate such that the electrode plate is placed between the folded parts of the film.

11. The stacking apparatus of claim 10, wherein the transfer unit comprises: a transfer plate disposed to face one side of the electrode plate; a cylinder connected to the transfer plate; and a motor generating drive force to move the cylinder towards the electrode plate.

12. The stacking apparatus of claim 10, wherein the base is composed of a plurality of bases, the transfer unit is composed of a plurality of transfer units, and the electrode plate transfer device further comprises a connection beam connecting the bases to each other such that the bases are disposed at upper and lower sides to be parallel to each other.

13. The stacking apparatus of claim 9, further comprising: a pressing plate which compresses the uppermost surface of the film in a downward direction when the electrode plate is inserted between the folded parts of the film by the electrode plate transfer device.

14. The stacking apparatus of claim 13, wherein the pressing plate has a smaller width than the electrode plate.

* * * * *